(12) United States Patent
Yagi

(10) Patent No.: US 7,291,798 B2
(45) Date of Patent: Nov. 6, 2007

(54) SWITCH DEVICE

(75) Inventor: Daisuke Yagi, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 157 days.

(21) Appl. No.: 11/151,358

(22) Filed: Jun. 14, 2005

(65) Prior Publication Data
US 2005/0274562 A1 Dec. 15, 2005

(30) Foreign Application Priority Data
Jun. 14, 2004 (JP) ............ P. 2004-175395

(51) Int. Cl.
*H01H 21/00* (2006.01)
(52) U.S. Cl. ................... 200/553; 200/61.54
(58) Field of Classification Search ............. 200/553
See application file for complete search history.

(56) References Cited

U.S. PATENT DOCUMENTS 3,809,833 A * 5/1974 Miller et al. ............ 200/61.27
6,538,220 B2 * 3/2003 Durocher ................ 200/61.54
7,102,091 B2 * 9/2006 Miyata et al. ........... 200/302.2
2006/0266634 A1 * 11/2006 Shahmuradyan ........... 200/564

FOREIGN PATENT DOCUMENTS

JP      2003-115229 A      4/2003

* cited by examiner

*Primary Examiner*—Elvin Enad
*Assistant Examiner*—Lheiren Mae A. Anglo
(74) *Attorney, Agent, or Firm*—Sughrue Mion, PLLC

(57) ABSTRACT

A switch device for vehicle use is provided with a switch case fixed to a handle bar of a vehicle. A unit case attached to the switch case is capable of rotating with respect to the switch case. An operation lever arranged in the unit case is capable of rotating together with the unit case. The operation lever is capable of operating a predetermined electrical component. The unit case can be freely rotated over a plurality of positions of use at which the operation lever can operate a predetermined electrical component. An object to be operated by the operation lever is made to be different according to a stopping position of the unit case.

7 Claims, 6 Drawing Sheets

SWITCH DEVICE

CROSS REFERENCE TO RELATED APPLICATIONS

The present application claims foreign priority based on Japanese Patent Application No. P.2004-175395, filed on Jun. 14, 2004, the contents of which are incorporated herein by reference.

BACKGROUND OF THE INVENTION

1. Field of the Invention

The present invention relates to a switch device for vehicle use, which is arranged on a handle bar of a vehicle, capable of operating various electrical components mounted on the vehicle.

2. Related Art

In general, a vehicle such as a two-wheeled vehicle or ATV (All Terrain Vehicle) having a handle bar is composed in such a manner that a switch case having an operation knob is fixed to a forward end side (in a neighborhood of a holding grip) of the handle bar and that an arbitrary electrical component mounted on the vehicle can be operated by the operation knob. For example, as disclosed in JP-A-2003-115229, a dimmer switch knob, a turn signal switch knob and a horn switch knob are arranged in the switch case. When each operation knob is operated, an arbitrary electrical component (a light, winker or horn) can be operated.

However, in the above conventional switch device for vehicle use, the following problems may be encountered. An object to be operated by each switch is decisively determined in the conventional switch device for vehicle use. In the case where an additional function (a so-called optional function) is added and mounted on a vehicle, it is difficult to newly attach an operational knob, which conducts the operation, to the switch case. It can be considered that an operational knob of operating the additional function, which is estimated to be necessary, is previously attached to the switch case. However, in this case, the following problems may be encountered. In the case where a plurality of additional functions are added, the number of objects to be operated is increased. Therefore, the number of operational knobs to be provided in the switch case is also increased. Furthermore, from the viewpoint of preventing the occurrence of wrong operation, it is preferable that the operational direction of the operation knob to operate the additional function is made to coincide with the moving direction of the additional function to be added.

SUMMARY OF THE INVENTION

One or more embodiments of the present invention provide a switch device for vehicle use characterized in that even when an additional function is added and mounted on a vehicle, the operation of operating the additional function can be easily executed by an operation lever of the switch case.

In accordance with one or more embodiments of the present invention, a switch device for vehicle use is provided with a switch case fixed to a handle bar of a vehicle; and an operation means, which is arranged in the switch case, for operating various electrical components mounted on the vehicle. The switch device for vehicle use is further provided with a unit case, which is attached to the switch case, capable of rotating with respect to the switch case; and an operation lever, which is arranged in the unit case, capable of rotating together with the unit case and also capable of operating a predetermined electrical component. In the switch device, the unit case can be freely rotated over a plurality of positions of use at which the operation lever can operate a predetermined electrical component, and an object to be operated by the operation lever is made to be different according to a stopping position of the unit case.

In accordance with one or more embodiments of the present invention, in a switch device for vehicle use, an operational direction of the operation lever is made to be variable according to a stopping position of the unit case, and the operational direction of the operation lever is made to substantially coincide with a moving direction of an electrical component to be operated.

In accordance with one or more embodiments of the present invention, in a switch device for vehicle use, the unit case can be rotated between the position of use of the operation lever and the position of no use at the time of not using the operation lever.

In accordance with one or more embodiments of the present invention, a switch device for vehicle use is further provided with a lock means for engaging the unit case with the switch case and for fixing the unit case at an arbitrary position.

Other aspects and advantages of the invention will be apparent from the following description and the appended claims.

In accordance with one or more embodiments of the present invention, the unit case can be freely rotated over a plurality of positions of use and an object to be operated by the operation lever is made to be different according to the stopping position of the unit case. Accordingly, the structure of the invention can be applied to a case in which a plurality of functions are added and mounted on a vehicle.

In accordance with one or more embodiments of the present invention, the operational direction of the operation lever is made to be variable according to the stopping position of the unit case. Further, the operational direction can be made to substantially coincide with the moving direction of an electrical component which is an object to be operated. Accordingly, operation can be sensibly conducted by an operator, and the occurrence of wrong operation can be suppressed.

In accordance with one or more embodiments of the present invention, the unit case can be rotated between a position of use and a position of no use at the time of not using the operation lever. Accordingly, the invention can excellently cope with a case in which the additional function is not used or the additional function is not mounted.

In accordance with one or more embodiments of the present invention, the unit case is engaged with the switch case and fixed at an arbitrary position by the lock means. Therefore, the unit case can be positively stopped at a predetermined position.

DESCRIPTION OF THE PREFERRED EMBODIMENTS

Embodiments of the invention will be described with reference to the accompanying drawings.

Figure 1:
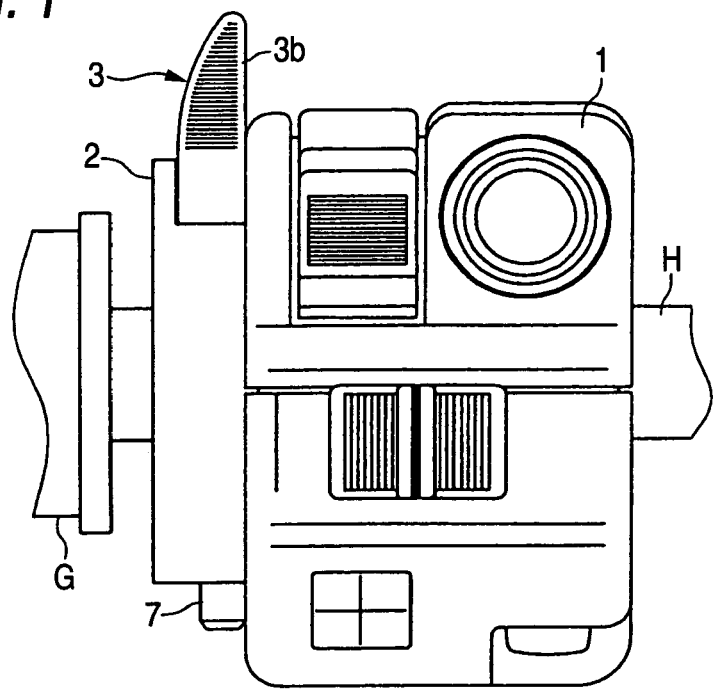
FIG. 1 is a front view showing a switch device according to one or more embodiments of the present invention, wherein the unit case is located at the first position of use.
Figure 2:
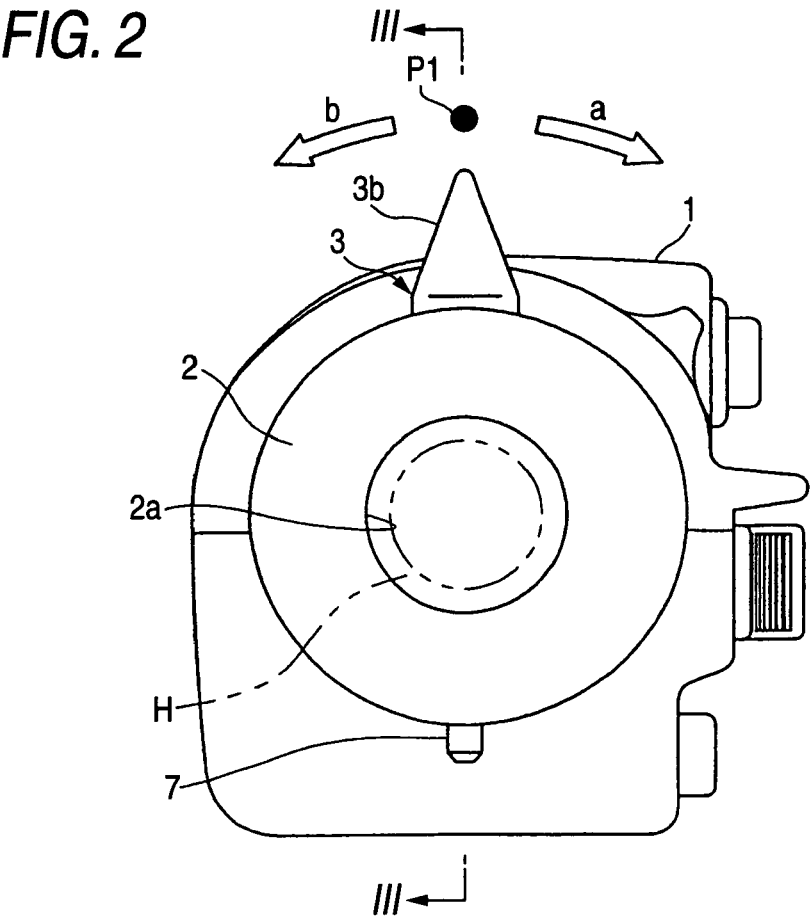
FIG. 2 is a left side view showing the switch device, wherein the unit case is located at the first position of use.

A switch device for vehicle use according to one or more embodiments of the present invention is fixed to a handle bar of a vehicle such as a two-wheeled vehicle or ATV so as to operate various electrical components mounted on a vehicle. As shown in FIGS. 1 and 2, the switch device for vehicle use mainly includes: a switch case 1, a unit case 2, an operation lever 3 and a lock means 7.

The switch case 1 is fixed to a neighborhood of the holding grip G of the handle bar H. On the front side (On the side opposed to a driver), a plurality of operation means for operating electrical components such as an engine stop switch button, a turn signal switch knob and so forth are provided. This switch case 1 is composed of a pair of split members. These split members are fixed at a predetermined position of the handle bar H when the handle bar H is interposed between the split members and then the split members are fastened by bolts.

Figure 3:
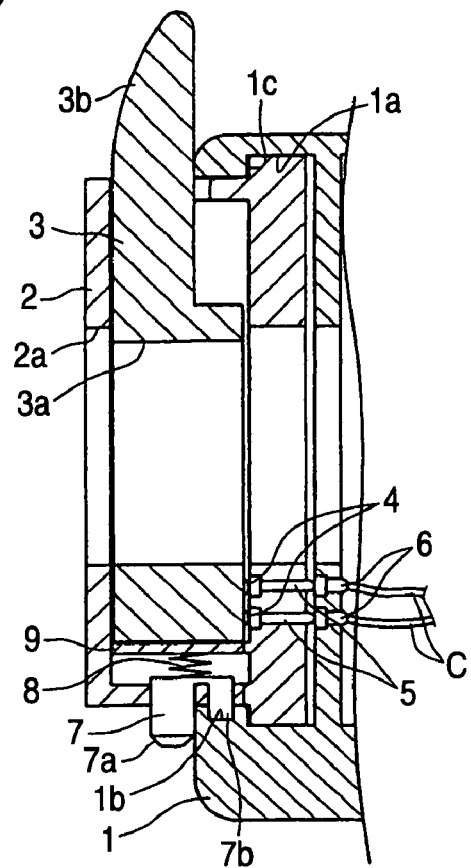
FIG. 3 is a sectional view taken on line III-III in FIG. 2.

The unit case 2 has an operation lever 3. The unit case 2 is pivotally attached to the switch case 1 being capable of rotating together with the operation lever 3. As shown in FIG. 3, this unit case 2 is accommodated in the accommodation hole 1a formed in the switch case 1 while the operating section 3b of the operation lever 3 is being protruded outside from the unit case 2. Further, the handle bar H is inserted into the insertion hole 2a formed at the substantial center of the unit case 2. In this connection, the unit case 2 is engaged with the step portion 1c formed in the accommodation hole 1a of the switch case 1, so that the unit case 2 can be prevented from being detached from the accommodation hole 1a. At the same time, the unit case 2 can be freely rotated round the handle bar H.

Figure 6:
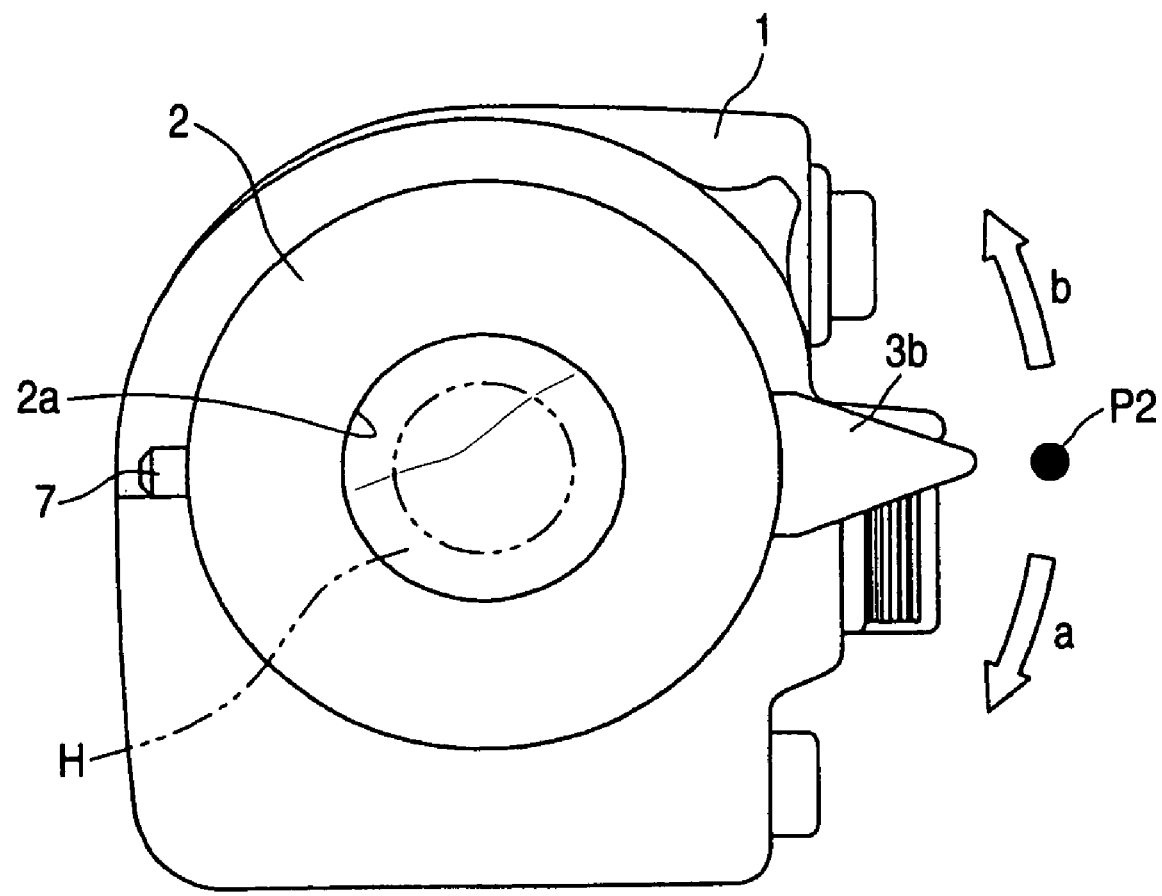
FIG. 6 is a left side view showing a switch device, wherein the unit case is located at the second position of use.
Figure 8:
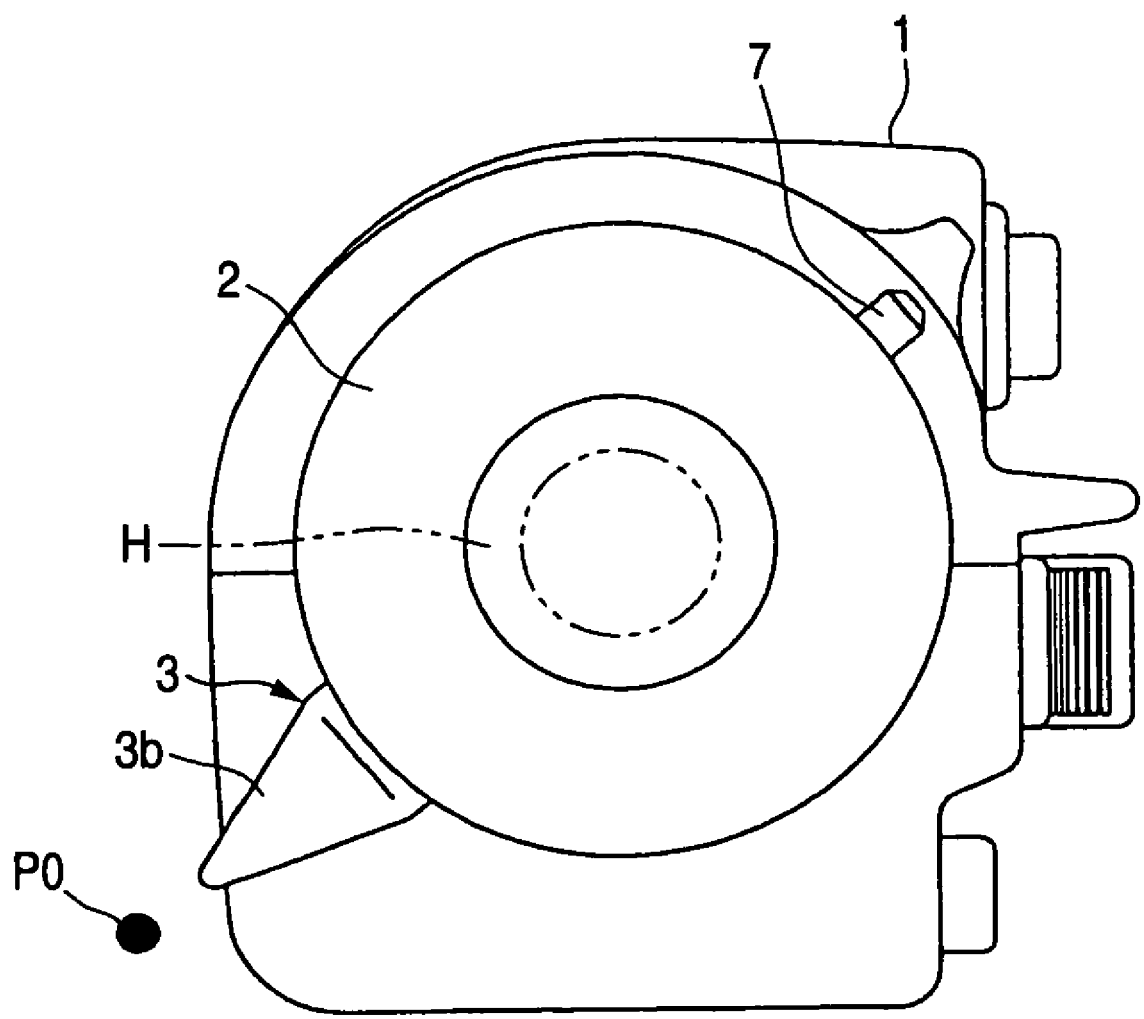
FIG. 8 is a left side view showing the switch device, wherein the unit case is located at the position of no use.

In this case, the thus composed unit case 1 can be rotated among the first position P1 of use, the second position P2 of use and the position P0 of no use. As shown in FIGS. 1 to 4, at the first position P1 of use, the operating section 3b of the operation lever 3 is directed upward, that is, the operation lever 3, which is at the neutral position, is directed in the perpendicular direction. As shown in FIG. 6, at the second position P2 of use, the operating section 3b concerned is directed toward the driver's side, that is, the operation lever 3, which is at the neutral position, is directed in the horizontal direction. As shown in FIG. 8, at the position P0 of no use, the operating section 3b concerned is directed toward the vehicle running direction, that is, the operating section 3b concerned is directed in the direction opposite to the driver.

In this case, when the unit case 1 is located at the first position P1 of use, for example, a winch of ATV, which can be additionally mounted on a vehicle as an additional function, can be operated. At the same time, when the unit case 1 is located at the second position P2 of use, for example, a snow plow of ATV, which can be additionally mounted on a vehicle as an additional function, can be operated. When the unit case 1 is located at the position P0 of no use, as shown in FIG. 8, the operating section 3b of the operation lever 3 is located at a position on the opposite side to a driver. Therefore, the operating section 3b of the operation lever 3 keeps out of the way.

Further, as shown in FIG. 3, the unit case 2 includes a lock means 7 which is pushed by the spring 8. In this lock means 7, the operating section 7a and the engaging section 7b are integrated with each other into one body. When the engaging section 7b is engaged with one of the engaging holes 1b formed in the switch case 1, the unit case 2 can be fixed at an arbitrary position. In this case, a plurality of engaging holes 1b are formed corresponding to the position P0 of no use of the unit case, the first position P1 of use and the second position P2 of use.

When the operating section 7a is pushed while resisting a pushing force of the spring 8, the engaging section 7b is released from the engaging hole 1b, so that the unit case 2 can be allowed to rotate. Further, when the engaging section 7b reaches a desired engaging hole 1b, the engaging section 7b enters the engaging hole 1b concerned by a pushing force of the spring 8. In this way, the rotation of the unit case 2 can be regulated. In this connection, reference numeral 9 shown in the drawing denotes a spring presser plate which is arranged in the unit case 2 and receives the other end side of the spring 8.

Figure 4:
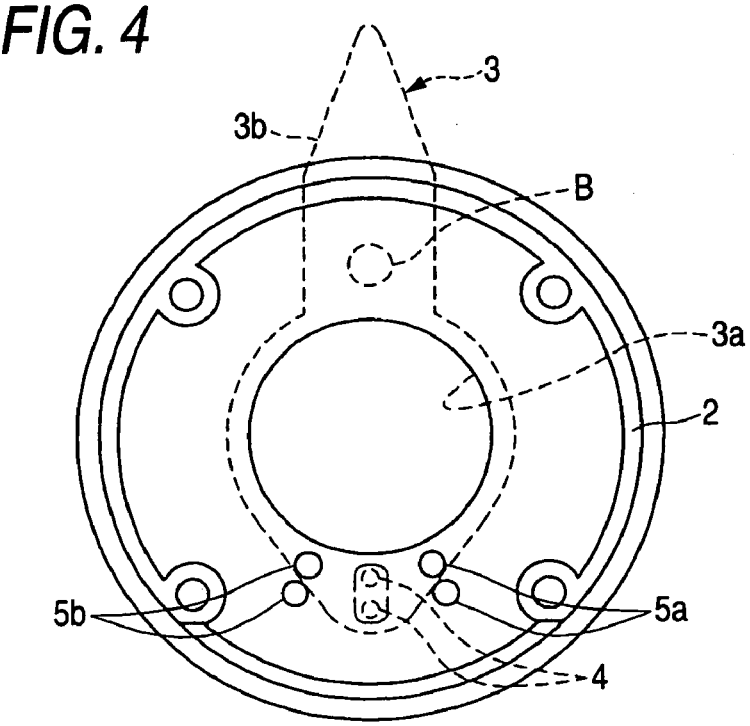
FIG. 4 is a schematic illustration showing a positional relation of the unit case and the operating lever of the switch device, wherein the unit case is located at the first position of use.

The operation lever 3 is provided in the unit case 2 and rotated together with the unit case 2. Further, when the operation lever 3 is rotated independently from the unit case 2, a predetermined electrical component can be operated by the operation lever 3. The operation lever 3 includes: an insertion hole 3a into which the handle bar H is inserted; and an operating section 3b capable of being operated by a driver. As shown in FIG. 4, the boss portion B is formed being protruded from the operation lever 3. A twist coil spring (not shown) is arranged between the boss portion B and the unit case 2.

In the normal state, the operation lever 3 is located at the neutral position. When the operation lever 3 is rotated in the direction a or b shown in FIG. 2, a pushing force is given to the operation lever 3 by the twist coil spring. Therefore, the operation lever 3 is spontaneously returned to the neutral position. Further, in the neighborhood of the lower end portion of the operation lever 3, the lever contact point 4 is formed. When the lever contact point 4 is rotated according to the rotation of the operation lever 3, the lever contact point 4 can be contacted with or separated from the case terminal 5a or 5b described later.

The case terminals 5a, 5b are fixed to the unit case 2. As shown in FIG. 4, the case terminals 5a, 5b are respectively located at the right and the left position with respect to the lever contact point 4 of the operation lever 3 which is located at the neutral position. Due to the above structure, when the operation lever is operated being rotated with respect to the unit case 2, the lever contact point 4 can be contacted with either the case terminal 5a or 5b. In this connection, in the case where the operation lever 3 is rotated together with the unit case 2, the relative positions of the lever contact point 4 and the case terminals 5a and 5b are not changed, that is, the lever contact point 4 and the case terminals 5a and 5b are kept separate from each other.

Figure 5A:
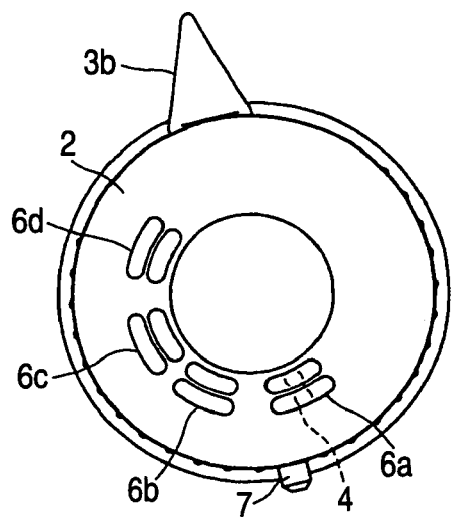
FIG. 5A is a schematic illustration for explaining operation of the operating lever in the switch device, wherein the unit case is located at the first position of use, and showing a state in which the operating lever is rotated with respect to the unit case.
Figure 5B:
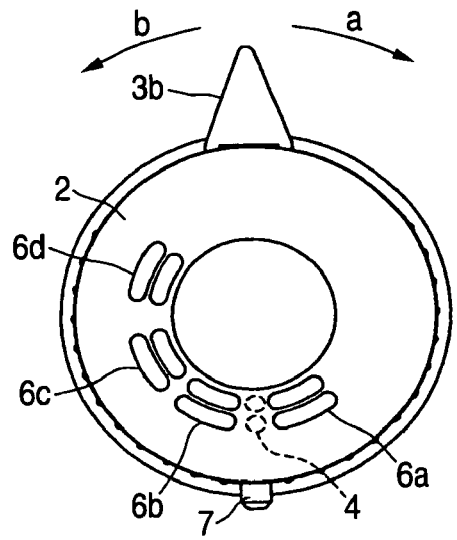
FIG. 5B is a schematic illustration for explaining operation of the operating lever in the switch device, wherein the unit case is located at the first position of use, and showing a state in which the operating lever is located at the neutral position.
Figure 5C:
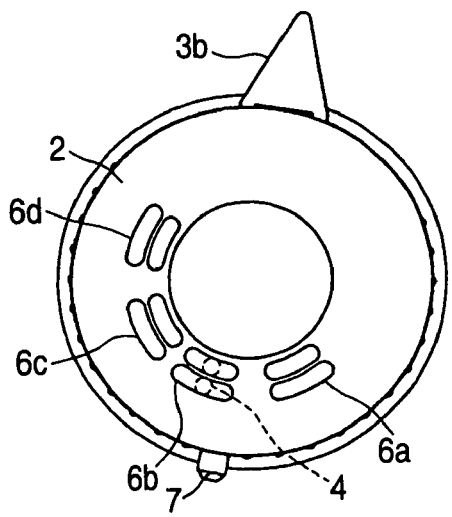
FIG. 5C is a schematic illustration for explaining operation of the operating lever in the switch device, wherein the unit case is located at the first position of use, and showing a state in which the operating lever is rotated with respect to the unit case.

On the face of the unit case 2 facing in the axial direction in the accommodation hole 1a of the switch case 1, as shown in FIG. 3, the stationary terminals 6 are formed. Cords C extending onto the vehicle side are connected to the stationary terminals 6. More specifically, as shown in FIGS. 5A to 5C, a plurality of stationary terminals 6a, to 6d are formed in the switch case 1. When the unit case 2 is located at the first position P1 of use, the case terminals 5a and 5b are contacted with the stationary terminals 6a, 6b.

When the lever 3 is located at the neutral position, that is, when the lever 3 is in the state shown in FIG. 5B, the lever contact point 4 is contacted with neither the case terminal 5a nor 5b, that is, no electrical continuity is accomplished. When the operation lever 3 is rotated in the direction a in this state, that is, when the operating section 3b of the operation lever 3 is pulled to the driver's side, the contact point and the case terminals are put into the state shown in FIG. 5C. Therefore, the lever contact point 4 is contacted with the case terminal 5b. Accordingly, the lever contact point 4, the case terminal 5b and the stationary terminals 6b, which is contacted with the case terminal 5b, are electrically continued to each other, and a predetermined electrical circuit can be formed, and for example, a winch of ATV can be pulled back toward the vehicle side.

When the operation lever 3, which is located at the neutral position, is rotated in the direction b, that is, when the operating section 3b is pushed in the direction so that it can go away from a driver, the device is set in the state shown in FIG. 5A, and the lever contact point 4 is contacted with the case terminal 5a. Therefore, the lever contact point 4, the case terminal 5a and the stationary terminal 6a, which comes into contact with the case terminal 5a concerned, are electrically continued to each other, and a predetermined electrical circuit can be formed. Accordingly, for example, a winch of ATV can be pulled out from the vehicle side.

Figure 7A:
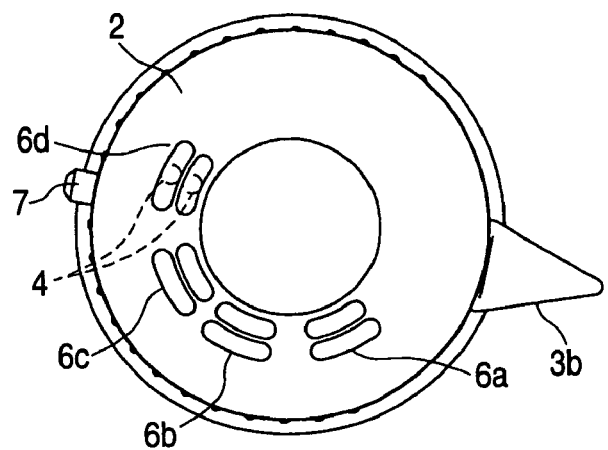
FIG. 7A is a schematic illustration for explaining operation of the operating lever in the switch device, wherein the unit case is located at the second position of use, showing a state in which the operating lever is rotated with respect to the unit case.
Figure 7B:
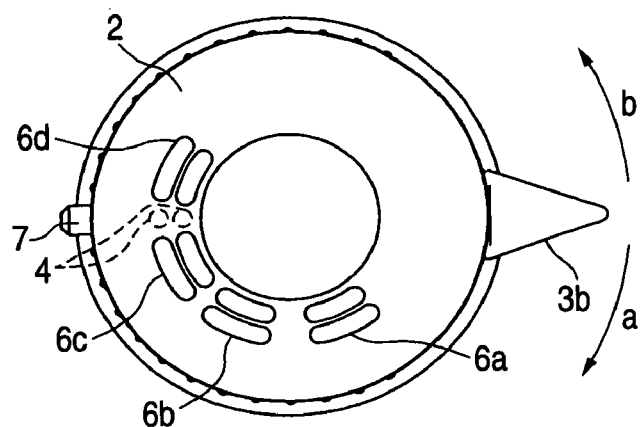
FIG. 7B is a schematic illustration for explaining operation of the operating lever in the switch device, wherein the unit case is located at the second position of use, showing a state in which the operating lever is located at the neutral position.
Figure 7C:
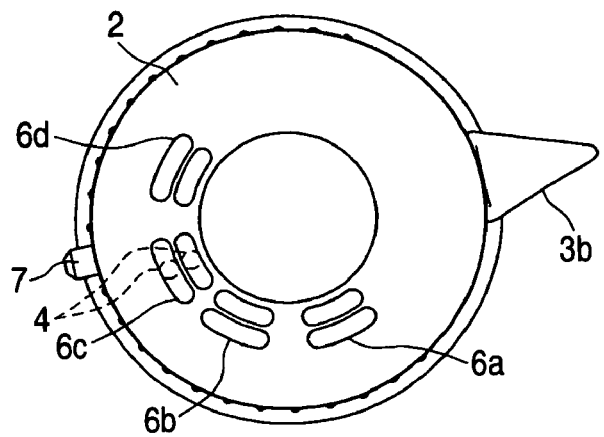
FIG. 7C is a schematic illustration for explaining operation of the operating lever in the switch device, wherein the unit case is located at the second position of use, showing a state in which the operating lever is rotated with respect to the unit case.

In this connection, when the unit case 2 is rotated and set at the second position P2 of use described before, the device is set in the state shown in FIG. 7B. Therefore, the case terminals 5a, 5b and the stationary terminals 6c, 6d are respectively contacted with each other. When the operation lever 3 is rotated from this neutral position in the direction a, that is, when the operating section 3b is pushed downward, the device is set in the state shown in FIG. 7A. Therefore, the lever contact point 4 is contacted with the case terminal 5b. Accordingly, the lever contact point 4, the case terminal 5b and the stationary terminal 6d, which comes into contact with the case terminal 5b, are electrically contacted with each other, and a predetermined electrical circuit can be formed. Therefore, for example, a snow plow of ATV comes down.

When the operation lever 3, which is located at the neutral position, is rotated in the direction b, that is, when the operating section 3b is pushed upward, the device is set in the state shown in FIG. 5C, and the lever contact point 4 is contacted with the case terminal 5a. Therefore, the lever contact point 4, the case terminal 5a and the stationary terminal c, which comes into contact with the case terminal 5a concerned, are electrically continued to each other, and a predetermined electrical circuit can be formed. Accordingly, for example, a snow plow of ATV can be raised.

However, when the unit case 2 is rotated and set at the position P0 of no use described before (shown in FIG. 8), the case terminals 5a, 5b do not come into contact with any of the stationary contact points 6a to 6d. In this case, at the position P0 of no use, the operating section 3b of the operation lever 3 is located being hidden from a driver, and it is impossible for the driver to operate the operation lever 3. Therefore, this state in which the operation lever 3 is hidden from the driver is suitable for the case in which the operation lever 3 is not used.

As described above, the unit case 2 can be freely rotated over a plurality of positions of use (the first position P1 or use and the second position P2 of use), and an object to be operated by the operation lever 3 is made to be different according to the stopping position of the unit case 2. Accordingly, it is possible to additionally mount a plurality of additional functions. In this embodiment, it is estimated that the additional functions are a winch and snow plow of ATV. In the case where no additional functions are mounted on a vehicle, when the unit case 2 is set at the position P0 of no use, the operation lever 3 can be kept out of the way. Therefore, even in the case where the additional function is not used or the additional function is not additionally mounted, it is possible for a driver to smoothly conduct operation.

According to the stopping position of the unit case 2, the operational direction of the operation lever 3 is made to be variable, that is, at the first position P1 of use, the operating section 3b is pulled to the driver's side and pushed in the direction so that the operating section 3b can be made to go away from the driver, and at the second position P2 of use, the operating section 3b is pushed downward and upward. Further, since the operational direction is made to substantially coincide with the moving direction of the electrical component (winch or snow plow) which is an object to be operated, it is possible for the driver to conduct a sensitive operation, and the occurrence of wrong operation can be prevented.

In the case where the unit case 2 is located at the first position P1 of use, the operation to pull the operating section 3b to the driver's side corresponds to the motion of drawing back the winch to the vehicle side, and the operation to push the operating section 3b in the direction so that it can be made to go away from the driver corresponds to the motion of drawing out the winch from the vehicle. In this case, each operational direction substantially coincides with the direction of the motion of the winch. In the case where the unit case 2 is located at the second position P2 of use, the operation to push the operating section 3b downward corresponds to a motion of making the snow plow come down, and the operation to push the operating section 3b upward corresponds to a motion of raising the snow plow. Each operation substantially corresponds to the moving direction of the snow plow.

Further, the unit case 2 can be engaged with the switch case 1 and fixed at an arbitrary position (the position P0 of no use, the first position P1 of use or the second position P2 of use) by the lock means 7. Therefore, the unit case 2 can be easily rotated or fixed, that is, the unit case 2 can be positively stopped at a predetermined stopping position. Since the unit case 2 can be positively fixed, it is possible to prevent the unit case 2 from being rotated together with the operation lever 3 when the operation lever 3 is operated, that is, the operation can be positively conducted.

One or more embodiments of the present invention have been explained above. However, the present invention is not limited to the above specific embodiment. For example, the present invention can be applied to a case in which the unit case is freely rotated between the position of no use and one position of use. Alternatively, the present invention can be applied to a case in which the unit case is freely rotated between the position of no use and three or more positions of use. Even in the above case or even in the case in which the additional functions are additionally mounted, the operation can be easily conducted by the operating lever. Further, even in the case in which the additional functions are not additionally mounted, the present invention can be excellently applied.

The object to be operated by the operation lever 2 at each stopping position of the unit case 2 is not limited to a winch or snow plow like the embodiment. The object to be operated by the operation lever 3 may be various additional functions estimated. Further, the lock means is not limited to the above structure. For example, the lock means may be a widely used fastening means such as bolts, by which the unit case 2 is fixed to the switch case 1 at an arbitrary position. In this connection, the vehicle to which the present invention is applied is not limited to a two-wheeled vehicle or ATV. The vehicle to which the present invention is applied may be another vehicle having an handle bar such as a snow vehicle or sand buggy.

As long as it is a switch device for vehicle use in which the unit case can be rotated between a plurality of positions of use at which a predetermined electrical component can be operated by the operation lever, the present invention can be applied to a switch device having a different appearance or a switch device to which the other function is added.

It will be apparent to those skilled in the art that various modifications and variations can be made to the described preferred embodiments of the present invention without departing from the spirit or scope of the invention. Thus, it is intended that the present invention coverall modifications and variations of this invention consistent with the scope of the appended claims and their equivalents.

What is claimed is:

1. A switch device comprising:
    a switch case attachable to a handle bar of a vehicle;
    a unit case arranged in the switch case and rotatable with respect to the switch case; and
    an operation lever associated with the unit case and rotatable with the unit case, wherein the unit case is rotatable over a plurality of positions and an object to be operated by the operation lever is different according to a stopping position of the unit case.

2. The switch device according to claim 1, wherein the operation lever is rotatable with respect to the unit case.

3. The switch device according to claim 1, wherein the object is one of electrical components mounted in the vehicle.

4. The switch device according to claim 1, wherein an operational direction of the operation lever is variable according to a stopping position of the unit case, and
    the operational direction of the operation lever substantially coincides with a moving direction of the object.

5. The switch device according to claim 4, wherein the unit case is rotatable between positions of use of the operation lever and a position of no use of the operation lever.

6. The switch device according to claim 1, wherein the unit case is rotatable between positions of use of the operation lever and a position of no use of the operation lever.

7. The switch device according to one of claim 1, further comprising:
    a lock means for engaging the unit case with the switch case and for fixing the unit case at an arbitrary position.

* * * * *